(12) United States Patent
Sperber et al.

(10) Patent No.: US 8,103,858 B2
(45) Date of Patent: Jan. 24, 2012

(54) EFFICIENT PARALLEL FLOATING POINT EXCEPTION HANDLING IN A PROCESSOR

(75) Inventors: Zeev Sperber, Zichron Yakov (IL); Shachar Finkelstein, Yokneam Illit (IL); Gregory Pribush, Haifa (IL); Arnit Gradstein, Binyamina (IL); Guy Bale, Haifa (IL); Thierry Pons, Hadera (IL)

(73) Assignee: Intel Corporation, Santa Clara, CA (US)

( * ) Notice: Subject to any disclaimer, the term of this patent is extended or adjusted under 35 U.S.C. 154(b) by 718 days.

(21) Appl. No.: 12/217,084

(22) Filed: Jun. 30, 2008

(65) Prior Publication Data

US 2009/0327665 A1 Dec. 31, 2009

(51) Int. Cl.
*G06F 9/00* (2006.01)
(52) U.S. Cl. .................... 712/222; 712/244
(58) Field of Classification Search ........... 712/244, 712/222
See application file for complete search history.

(56) References Cited

U.S. PATENT DOCUMENTS

| | | | | |
|---|---|---|---|---|
| 5,053,631 A * | 10/1991 | Perlman et al. | ............... | 708/508 |
| 5,128,888 A * | 7/1992 | Tamura et al. | ............... | 708/508 |
| 5,341,320 A * | 8/1994 | Trissel et al. | ............... | 708/498 |
| 5,347,481 A * | 9/1994 | Williams | ............... | 708/503 |
| 5,768,169 A * | 6/1998 | Sharangpani | ............... | 708/495 |
| 5,884,062 A * | 3/1999 | Wichman et al. | ............... | 712/218 |
| 5,923,871 A * | 7/1999 | Gorshtein et al. | ............... | 712/221 |
| 5,931,895 A * | 8/1999 | Yamada et al. | ............... | 708/500 |
| 5,991,863 A * | 11/1999 | Dao et al. | ............... | 711/219 |
| 6,021,422 A * | 2/2000 | Schwarz | ............... | 708/503 |
| 6,105,047 A * | 8/2000 | Sharangpani et al. | ............... | 708/495 |
| 6,230,253 B1 * | 5/2001 | Roussel et al. | ............... | 712/22 |
| 6,490,607 B1 * | 12/2002 | Oberman | ............... | 708/620 |
| 6,601,079 B1 * | 7/2003 | Phillips | ............... | 708/495 |
| 7,363,471 B2 * | 4/2008 | Berkowits et al. | ............... | 712/221 |
| 7,430,656 B2 * | 9/2008 | Sperber et al. | ............... | 712/221 |
| 2002/0010847 A1 * | 1/2002 | Abdallah et al. | ............... | 712/22 |
| 2002/0178197 A1 * | 11/2002 | Steele, Jr. | ............... | 708/495 |
| 2004/0128486 A1 * | 7/2004 | Sperber et al. | ............... | 712/221 |
| 2004/0199755 A1 * | 10/2004 | Sperber et al. | ............... | 712/244 |
| 2005/0027965 A1 * | 2/2005 | Yamada et al. | ............... | 712/34 |

OTHER PUBLICATIONS

Rospatent Federal State Institution, Official Action dated Oct. 5, 2010 in Russian patent application No. 2009124710/08(034249).
Korean Patent Office, Notice of Preliminary Rejection dated Dec. 22, 2010 in Korean patent application No. 10-2009-59037.

(Continued)

*Primary Examiner* — Idriss N Alrobaye
(74) *Attorney, Agent, or Firm* — Trop, Pruner & Hu, P.C.

(57) ABSTRACT

Methods and apparatus are disclosed for handling floating point exceptions in a processor that executes single-instruction multiple-data (SIMD) instructions. In one embodiment a numerical exception is identified for a SIMD floating point operation and SIMD micro-operations are initiated to generate two packed partial results of a packed result for the SIMD floating point operation. A SIMD denormalization micro-operation is initiated to combine the two packed partial results and to denormalize one or more elements of the combined packed partial results to generate a packed result for the SIMD floating point operation having one or more denormal elements. Flags are set and stored with packed partial results to identify denormal elements. In one embodiment a SIMD normalization micro-operation is initiated to generate a normalized pseudo internal floating point representation prior to the SIMD floating point operation when it uses multiplication.

15 Claims, 9 Drawing Sheets

OTHER PUBLICATIONS

German Patent Office, Office Action dated Dec. 20, 2010 in German patent application No. 102009030525.4-53.

The Architecture for the Digital World, "Details of a New Cortex Processor Revealed, Cortex-A9," ARM Developers' Conference, Oct. 2007, pp. 1-10.

E.M. Schwartz, et al., "FPU Implementations With Denormalized Numbers," 2005, pp. 825-836.

Chinese Patent Office, Office Action mailed Apr. 25, 2011 in Chinese application No. 200910139647.1.

Japanese Patent and Trademark Office, Office Action mailed Aug. 9, 2011 in Japanese application No. 2009-152985.

Korean Intellectual Property Office, Office Action mailed Aug. 31, 2011 in Korean application No. 10-2009-59037.

* cited by examiner

EFFICIENT PARALLEL FLOATING POINT EXCEPTION HANDLING IN A PROCESSOR

FIELD OF THE DISCLOSURE

This disclosure relates generally to the field of microprocessors. In particular, the disclosure relates to efficient techniques for handling floating point exceptions in a processor that executes single-instruction multiple-data (SIMD) instructions.

BACKGROUND OF THE DISCLOSURE

The IEEE (Institute of Electrical and Electronics Engineers) standard for floating point arithmetic (IEEE 754) specifies how floating point numbers of single precision (32 bit), double precision (64 bit)), single-extended precision ($\geq$43-bit, not commonly used) and double-extended precision ($\geq$79-bit, usually implemented with 80 bits) are to be represented (including negative zero, denormals, infinities and NaNs, which stands for "not a number"), as well as how arithmetic should be carried out on them. Only 32-bit values are required by the standard; the others are optional. It also specifies four rounding modes and five exceptions (including when the exceptions occur, and what happens when they do occur).

The exponents are biased by $(2^{e-1})-1$, where e is the number of bits used for the exponent field. For example, a single precision number has an 8-bit exponent and so its exponent is stored with $2^7-1=127$ added to it, also called "biased with 127." Normal single precision exponents range between $-126$ and 127. An exponent of 128 is reserved for plus or minus infinity. An exponent of $-127$ (all zeroes) is reserved for plus or minus zero (or for denormals, but in the case of denormals the bias used is $(2^{e-1})-2$, i.e. 126 not 127, since the most significant bit of the mantissa is presumed to be zero, not one). Some examples of single precision floating point representations are illustrated in Table 1.

TABLE 1

Example single precision floating point representations.

| type | sign | exp | exp + bias | exponent fraction |
|---|---|---|---|---|
| zeroes | 0 or 1 | −127 | 0 | 0000 0000 000 0000 0000 0000 0000 0000 |
| one | 0 | 0 | 127 | 0111 1111 000 0000 0000 0000 0000 0000 |
| minus one | 1 | 0 | 127 | 0111 1111 000 0000 0000 0000 0000 0000 |
| min denormal | 0 or 1 | −126 | 0 | 0000 0000 000 0000 0000 0000 0000 0001 |
| max denormal | 0 or 1 | −126 | 0 | 0000 0000 111 1111 1111 1111 1111 1111 |
| min normal | 0 or 1 | −126 | 1 | 0000 0001 000 0000 0000 0000 0000 0000 |
| max normal | 0 or 1 | 127 | 254 | 1111 1110 111 1111 1111 1111 1111 1111 |
| infinities | 0 or 1 | 128 | 255 | 1111 1111 000 0000 0000 0000 0000 0000 |
| NaN | 0 or 1 | 128 | 255 | 1111 1111 Non zero |

The normal floating point number has value, $v=s \times 2^e \times m$, where s, e and m are defined as:
- s=+1 (positive numbers and +0) when the sign bit is 0
- s=−1 (negative numbers and −0) when the sign bit is 1
- e=exponent−bias (i.e. the exponent is stored with a bias added to it)
- m=1.fraction in binary (that is, the mantissa or significand is the implicit leading bit value 1 followed by the radix point followed by the binary bits of the fraction). Thus, $1 \leq m < 2$.

A denormal number (also called a denormalized number, or a subnormal number) is a number smaller (in absolute value) than the smallest normal number but still non-zero. The production of a denormal is sometimes called gradual underflow because it allows a calculation to lose precision slowly when the result is small. Denormal numbers were implemented in the Intel 8087 floating point coprocessor while the IEEE 754 standard was being written. This implementation demonstrated that denormals could be supported in a practical implementation.

In a normal floating point representation, it is assumed that the leading binary digit in the mantissa is equal to 1. Since it is known to be equal to 1, the leading binary digit of the mantissa may, in some floating point representations, be omitted and the exponent value adjusted accordingly. Denormal values are those values which cannot be represented in normalized form (i.e., having the smallest possible exponent with a mantissa that is non-zero). Some implementations of floating point units (FPUs) do not directly support denormal numbers in hardware, but rather trap to some kind of software or microcode support. While this may be transparent to the user, it can result in calculations which produce or consume denormal numbers being much slower than similar calculations on normal numbers.

Modern processors may also have instructions that perform single-instruction multiple-data (SIMD) operations on floating point numbers. When these SIMD operations produce or consume denormals, an exception may be triggered to handle the operation in software or in hardware under the assistance of microcode. One way to support denormals in hardware is through a wider internal representation, which has enough precision to simply treat denormals as small normals. For example, if an exception involving single precision denormals is triggered, microcode may convert the single precision operands to normal double precision operands and re-execute the operations on the wider representations followed by denormalizing the results and converting them back to single precision. Likewise, double precision denormals may be handled as double-extended precision normals. One drawback is that calculations which produce or consume denormal numbers still become significantly slower than similar calculations on normal numbers.

To date, more efficient techniques for handling floating point exceptions in a processor that executes SIMD instructions have not been fully explored.

BRIEF DESCRIPTION OF THE DRAWINGS

The present invention is illustrated by way of example and not limitation in the figures of the accompanying drawings.

DETAILED DESCRIPTION

Figure 1:
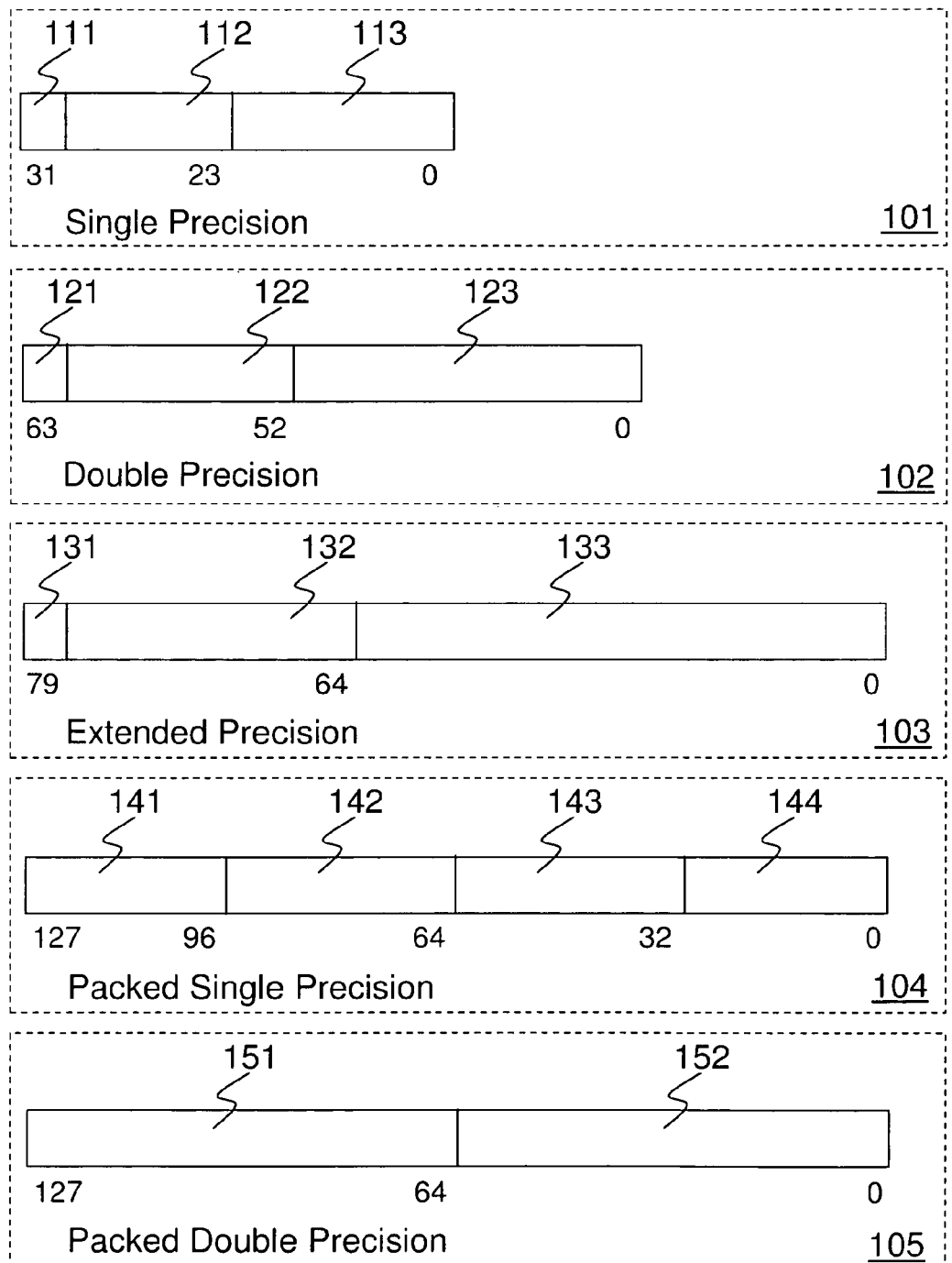
FIG. 1 illustrates exemplary storage formats for storing scalar and packed IEEE floating point numbers.

Methods and apparatus are disclosed for handling floating point exceptions in a processor that executes single-instruction multiple-data (SIMD) instructions. In one embodiment a numerical exception is identified for a SIMD floating point operation and a pair of SIMD micro-operations are initiated to generate two packed partial results of a packed result for the SIMD floating point operation. A numerical exception in the context of the following disclosure may be understood to include at least an exception triggered by identifying a denormal input value, or by identifying an underflow condition which could potentially produce a denormal output value as a result, and consequently may require microcode assistance. A SIMD denormalization micro-operation is initiated to combine the two packed partial results and to denormalize one or more elements of the combined packed partial results to generate a packed result for the SIMD floating point operation having one or more denormal elements. Flags may be set and stored with the packed partial results and/or the packed results to identify the denormal elements.

In one embodiment a SIMD normalization micro-operation is initiated to generate a normalized pseudo internal floating point representation prior to the SIMD floating point operation when it is a multiplication (or a division, a square root or a conversion). Such pseudo internal floating point representations may be stored in the same registers as normal packed floating point operands, with flags set to indicate which corresponding pseudo internal floating point representations of denormal elements need to be converted to actual internal floating point representations of denormal elements. In such pseudo internal floating point representations of denormal elements, the mantissas may be normalized and the exponents may be stored in such a way that they may be easily recovered into a wider exponent of an actual internal floating point representation. For example, if the number of leading zeroes of the mantissa is subtracted from the exponent of a denormal (biased in the wider exponent format of the actual internal floating point representation) the upper bits may be constant (e.g. 10) and therefore, can be dropped from the pseudo internal floating point representation and easily recovered.

Thus, such techniques may be used for transparently handling SIMD floating point exceptions concurrently without converting to scalar operations and requiring the execution of only a small number of additional micro-operations.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents. In the following description, for purposes of explanation, numerous specific details are set forth in order to provide a thorough understanding of the present invention. One of ordinary skill in the art, however, will appreciate that these specific details are not necessary in order to practice some embodiments of the present invention. In other instances, well known electrical structures and circuits have not been set forth in particular detail in order not to obscure embodiments of the present invention.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

FIG. 1 illustrates some exemplary storage formats 101-105 for storing scalar and packed IEEE floating point numbers. Single precision format 101 comprises 32 bits: a sign bit 111, 8 exponent bits 112, and 23 significand or mantissa bits 113. Double precision format 102 comprises 64 bits: a sign bit 121, 11 exponent bits 122, and 52 significand or mantissa bits 123. Double extended precision format 103 comprises 80 bits: a sign bit 131, 15 exponent bits 132, and 64 significand or mantissa bits 133. In each of the storage formats for IEEE floating point numbers, the significands or mantissas 112, 122 and 132, may also include an implicit most significant bit, J, that is presumed to be equal to one. Thus, if the 52-bit mantissa of double precision format 102, for example, stored the hexadecimal value, 23456789ABCDE, the hexadecimal value being represented is, 1.23456789ABCDE with the radix point following the implicit J bit. The exponents are biased by $(2^{e-1})-1$, where e is the number of bits used for the exponent field. Thus the 8-bit exponent of the single precision format 101 is biased by 127, and the 11-bit exponent of the double precision format 102 is biased by 1023.

Packed single precision format 104 comprises 128 bits, each of the 32-bit portions 141-144 storing a single precision floating point number having the single precision format 101. Packed double precision format 105 also comprises 128 bits, each of the 64-bit portions 151-152 storing a double precision floating point number having the double precision format 102. Packed single precision format 104 and packed double precision format 105 are known in the art to be useful for performing SIMD floating point operations. It will be appreciated that while packed single precision format 104 and packed double precision format 105 have been illustrated as comprising 128 bits, the present invention is not so limited. In particular, embodiments of the present invention may include formats for packed single precision and packed double precision floating point numbers that comprise 256 bits or 512 bits of data or more for performing SIMD floating point operations.

When these SIMD floating point operations produce or consume denormals, an exception (possibly masked) may be triggered to handle the operation in software or in hardware and/or under the assistance of microcode. In some prior processors, handling such exceptions may have included converting the packed floating point numbers to scalar floating point numbers of a wider representation and re-execute the operations as scalar operations on the wider representations followed by denormalizing the results as necessary and converting them back into packed floating point numbers. As noted above, processing such calculations which produce or consume denormal numbers may become significantly slower than similar calculations on normal numbers, especially if formats for packed floating point numbers may comprise 256 bits or 512 bits or more of data. Thus there is a need for the more efficient techniques herein disclosed for handling floating point exceptions in a processor that executes SIMD instructions.

Figure 2:
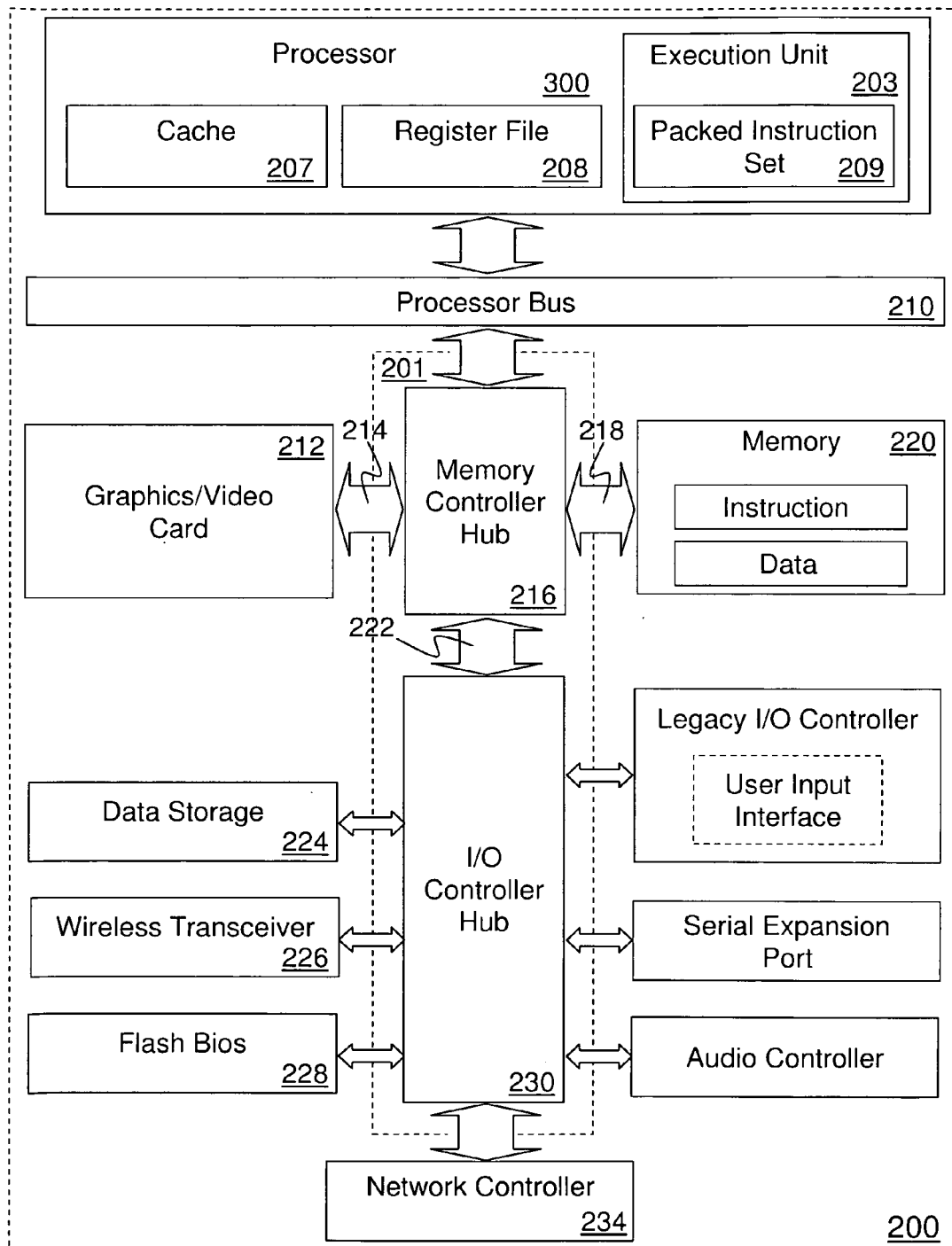
FIG. 2 illustrates one embodiment of a system including a processor that executes SIMD floating point instructions and uses efficient techniques for handling SIMD floating point exceptions.

FIG. 2 illustrates one embodiment of a system 200 including a processor 300 that executes SIMD floating point instructions and uses more efficient techniques for handling SIMD floating point exceptions. System 200 includes a component, such as processor 300 to employ execution units including logic to perform algorithms for performing SIMD floating point operations, in accordance with the present invention, such as in the embodiment described herein. System 200 is representative of processing systems based on the PENTIUM® III, PENTIUM® 4, CELERON®, XEON™, ITANIUM®, CENTRINO®, CORE™ Duo, CORE™ 2 Duo and/or CORE™ 2 Quad microprocessors available from Intel Corporation of Santa Clara, Calif., although other systems (including PCs having other microprocessors, engineering workstations, set-top boxes and the like) may also be used. In one embodiment, example system 200 may execute a version of a WINDOWS™ operating system available from Microsoft Corporation of Redmond, Wash., although other operating systems (MAC OS® X LEOPARD® operating system, UNIX and/or Linux for example), embedded software, and/or graphical user interfaces, may also be used. Thus, the present invention is not limited to any specific combination of hardware circuitry and software.

Processor 300 includes one or more execution units 203 to execute SIMD instructions on packed floating point data in accordance with the present invention. The present embodiment is described in the context of a single processor desktop or server system, but alternative embodiments can be included in a multiprocessor system. One embodiment of system 200 is an example of a hub architecture. Computer system 200 includes a processor 300 to process data signals. The processor 300 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 300 is coupled to a processor bus 210 that can transmit data signals between the processor 300 and other components in the system 200. The elements of system 200 perform their conventional functions that are well known to those familiar with the art.

In one embodiment, the processor 300 includes a Level 1 (L1) internal cache memory 207. Depending on the architecture, the processor 300 can have a single internal cache or multiple levels of internal cache. Alternatively, in another embodiment, the cache memory can reside external to the processor 300. Other embodiments can also include a combination of both internal and external caches depending on the particular implementation and needs. Register file 208 can store different types of data in various registers including SIMD and/or scalar registers, integer registers, floating point registers, status registers, and instruction pointer register.

Execution unit 203, including logic to perform integer and floating point operations, also resides in the processor 300. The processor 300 also includes a microcode (ucode) ROM that stores microcode for certain macroinstructions and/or for handling exceptional operations in hardware under the assistance of microcode. For this embodiment, execution unit 203 includes logic to handle a packed instruction set 209, which includes SIMD floating point instructions. By including the packed instruction set 209 in the instruction set of a general-purpose processor 300, along with associated circuitry to execute the instructions, the operations used by many multimedia applications may be performed using packed data in a general-purpose processor 300. Thus, many multimedia applications can be accelerated and executed more efficiently by using the full width of a processor's data bus for performing operations on packed data. This can eliminate the need to transfer smaller units of data across the processor's data bus to perform one or more operations, one data element at a time.

Alternate embodiments of an execution unit 203 can also be used in micro controllers, embedded processors, graphics devices, DSPs, and other types of logic circuits. System 200 includes a memory 220. Memory 220 can be a dynamic random access memory (DRAM) device, a static random access memory (SRAM) device, flash memory device, or other memory device. Memory 220 can store instructions and/or data represented by data signals that can be executed by the processor 300.

A system logic chip 216 is coupled to the processor bus 210 and memory 220. The system logic chip 216 in the illustrated embodiment is a memory controller hub (MCH). The processor 300 can communicate to the MCH 216 via a processor bus 210. The MCH 216 provides a high bandwidth memory path 218 to memory 220 for instruction and data storage and for storage of graphics commands, data and textures. The MCH 216 is to direct data signals between the processor 300, memory 220, and other components in the system 200 and to bridge the data signals between processor bus 210, memory 220, and system I/O 222. In some embodiments, the system logic chip 216 can provide a graphics port for coupling to a graphics controller 212. The MCH 216 is coupled to memory 220 through a memory interface 218. The graphics card 212 is coupled to the MCH 216 through an Accelerated Graphics Port (AGP) interconnect 214.

Some embodiments of system 200 use a proprietary hub interface bus 222 to couple the MCH 216 to the I/O controller hub (ICH) 230. The ICH 230 provides direct connections to some I/O devices via a local I/O bus. The local I/O bus is a high-speed I/O bus for connecting peripherals to the memory 220, chipset, and processor 300. Some examples are the audio controller, firmware hub (flash BIOS) 228, wireless transceiver 226, data storage 224, legacy I/O controller containing user input and keyboard interfaces, a serial expansion port such as Universal Serial Bus (USB), and a network controller 234. The data storage device 224 can comprise a hard disk drive, a floppy disk drive, a CD-ROM device, a flash memory device, or other mass storage device. In some embodiments of system 200, MCH 216 and ICH 230 may be integrated into a single system logic chip 201. In some alternative embodiments MCH 216 may be integrated directly into processor 300 for direct processor 300 access to memory 220. For another embodiment of system 200, processor 300 may be integrated directly into a system on a chip. One embodiment of a system on a chip comprises of a processor 300 and a memory 220. The memory 220 for one such system is a flash memory. The flash memory 220 can be located on the same die as the processor 300 and other system components. Additionally, other logic blocks such as a memory controller or graphics controller can also be located on a system on a chip.

Figure 3:
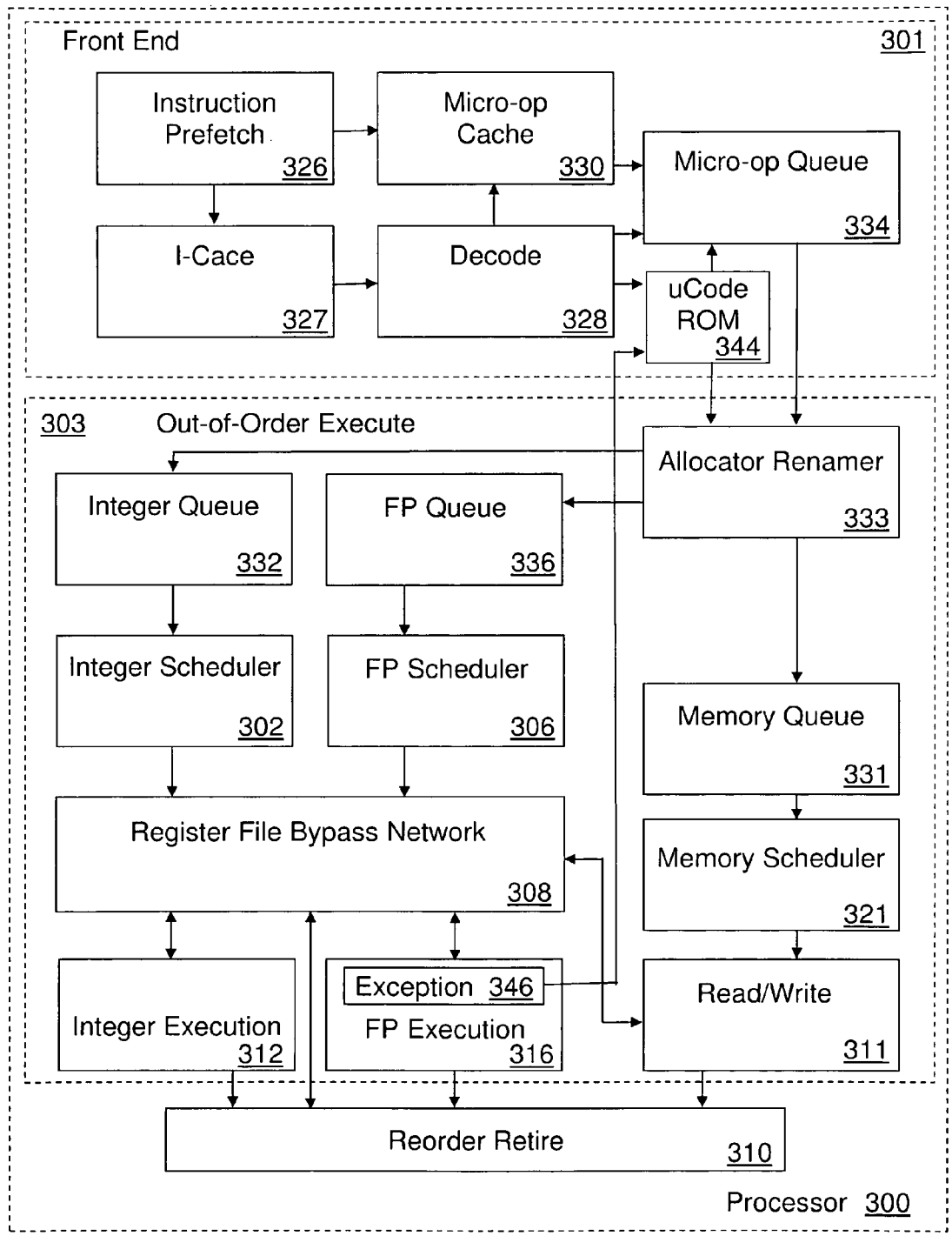
FIG. 3 illustrates one embodiment of a processor that executes SIMD floating point instructions and uses efficient techniques for handling SIMD floating point exceptions.

FIG. 3 illustrates one embodiment of a processor 300 that executes SIMD floating point instructions and uses efficient techniques for handling SIMD floating point exceptions. The in-order front end 301 is the part of the processor 300 that fetches the macro-instructions to be executed and prepares them to be used later in the processor pipeline. The front end 301 of this embodiment includes several units. The instruction prefetcher 326 fetches macro-instructions from memory 220 and/or from I-cache 327 and feeds them to an instruction decoder 328 which in turn decodes them into primitives called micro-instructions or micro-operations (also called micro-ops or uops) that the machine know how to execute. The micro-op cache 330 takes decoded micro-ops and stores them for future re-execution without decoding. Some embodiments of micro-op cache 330 may include a trace cache that assembles micro-ops into program ordered sequences or traces in the micro-op queue 334 for execution. For some embodiments, when decoder 328 or when a trace cache of micro-op cache 330 encounters a complex macro-instruction, the microcode ROM 344 may provide the micro-ops needed to complete the operation.

Many macro-instructions are converted into single micro-ops, but others need several micro-ops to complete the full operation. In one embodiment, if more than four micro-ops are needed to complete a macro-instruction, the decoder 328 accesses the microcode ROM 344 to provide the required micro-ops to execute the macro-instruction.

For one embodiment, an exception for a floating point operation can be encoded into, and handled by a small number of micro-ops in microcode ROM 344 for re-executing the floating point operation in such a way as to provide support for exceptional case such as denormals in a processor 300 that executes SIMD floating point instructions.

Some SIMD and other multimedia types of instructions are considered complex instructions. Most floating point related instructions are also complex instructions. As such, when the instruction decoder 328 encounters a complex macro-instruction, the microcode ROM 344 is accessed at the appropriate location to retrieve the microcode sequence for that macro-instruction. The various micro-ops needed for performing that macro-instruction are communicated to the out-of-order execution engine 303 for execution at the appropriate integer and floating point execution units.

The out-of-order execution engine 303 is where the micro-instructions are prepared for execution. The out-of-order execution logic has a number of buffers to smooth out and re-order the flow of micro-instructions to optimize performance as they progress through the pipeline and are scheduled for execution. Allocator renamer logic 333 allocates machine buffers and resources that each micro-op needs in order to execute, and renames logical registers onto entries in a register file. One embodiment of allocator renamer logic 333 also allocates an entry for each micro-op in various queues, which may include a memory queue 331 for memory operations, an integer queue 332 for integer or fixed point operations, and a floating point queue 336 for floating point operations. From these queues (e.g. 331, 332 and 336 respectively) micro-ops are scheduled by memory scheduler 321, integer scheduler 302 and floating point scheduler 306, for execution respectively by read/write unit 311, integer execution unit 312 and floating point execution unit 316. The micro-op schedulers 321, 302 and 306, determine when a micro-op is ready to execute based on the readiness of their dependent input register operand sources and the availability of the execution resources the micro-ops need to complete their operation. It will be appreciated that each or any of execution units 311, 312 and 316 may have duplicated execution units for performing scalar or SIMD operations.

Register file bypass network 308 is between the schedulers 321, 302 and 306, and the execution units 311, 312 and 316. In some embodiments of register file bypass network 308, there may be a separate register file for integer and floating point operations. Each register file of such embodiments may also includes a bypass network that can bypass or forward just completed results that have not yet been written into the register file to new dependent micro-ops, and may also be capable of communicating data with each other. For alternative embodiments of register file bypass network 308 may be unified. One alternative embodiment of register file bypass network 308 has at least 256 bit wide register entries for storing packed source and destination operands including packed floating point source operands and packed floating point results for SIMD floating point operations.

Some embodiments of micro-op schedulers 321, 302 and 306 may dispatch dependent operations before a parent load has finished executing. As micro-ops are speculatively scheduled and executed in processor 300, the processor 300 also includes logic to handle memory misses. If a data load misses in the data cache, there can be dependent operations in flight in the pipeline that have left the scheduler with temporarily incorrect data. A replay mechanism may track and re-execute instructions that use incorrect data. Only the dependent operations may need to be replayed and the independent ones may be allowed to complete. When the execution of micro-ops have been completed they are retired in sequential program order by reorder retire logic 310.

One embodiment of floating point execution unit 316 includes an exception circuit 346 to identify exceptions for SIMD floating point operations including, for example, numerical exceptions. A microcode exception handler, which may reside in microcode ROM 344 or some specialized finite state machine (e.g. in exception circuit 346) utilizes the microcode ROM 344, responsive to a numerical exception, to initiate a sequence of SIMD micro-operations for the SIMD floating point operation that encountered the exception. In one embodiment the SIMD micro-operations generate two packed partial results of a packed result for the SIMD floating point operation. A SIMD denormalization micro-operation combines the two packed partial results and denormalizes one or more elements of the combined packed partial results to generate a packed result for the SIMD floating point operation having one or more denormal elements. Flags may be set and stored with the packed partial results to identify a denormal result in one or more of the elements, in which case a normalization of one of the packed partial results may be required for some embodiments prior to the denormalization micro-operation.

In one embodiment of the microcode exception handler, the microcode ROM 344 may also be utilized to initiate a SIMD normalization micro-operation to generate a normalized pseudo internal floating point representation as part of the sequence of SIMD micro-operations for the SIMD floating point operation when it is a multiplication. Flags may be set and stored with the packed results to identify a denormal result represented in the normalized pseudo internal floating point representation. For this embodiment a SIMD normalization micro-operation may not be necessary when the SIMD floating point operation is an addition because the SIMD floating point adder may be capable of accepting packed operands including denormal values as inputs for a SIMD floating point addition. In some embodiments, flags may be set and stored with the normalized pseudo internal floating point representation to identify the denormal elements and enable reconstruction of an actual internal floating point representation from the normalized pseudo internal floating point representation.

Thus a microcode assist mechanism as described above may utilize the microcode ROM 344 to transparently handle SIMD floating point exceptions.

Figure 4:
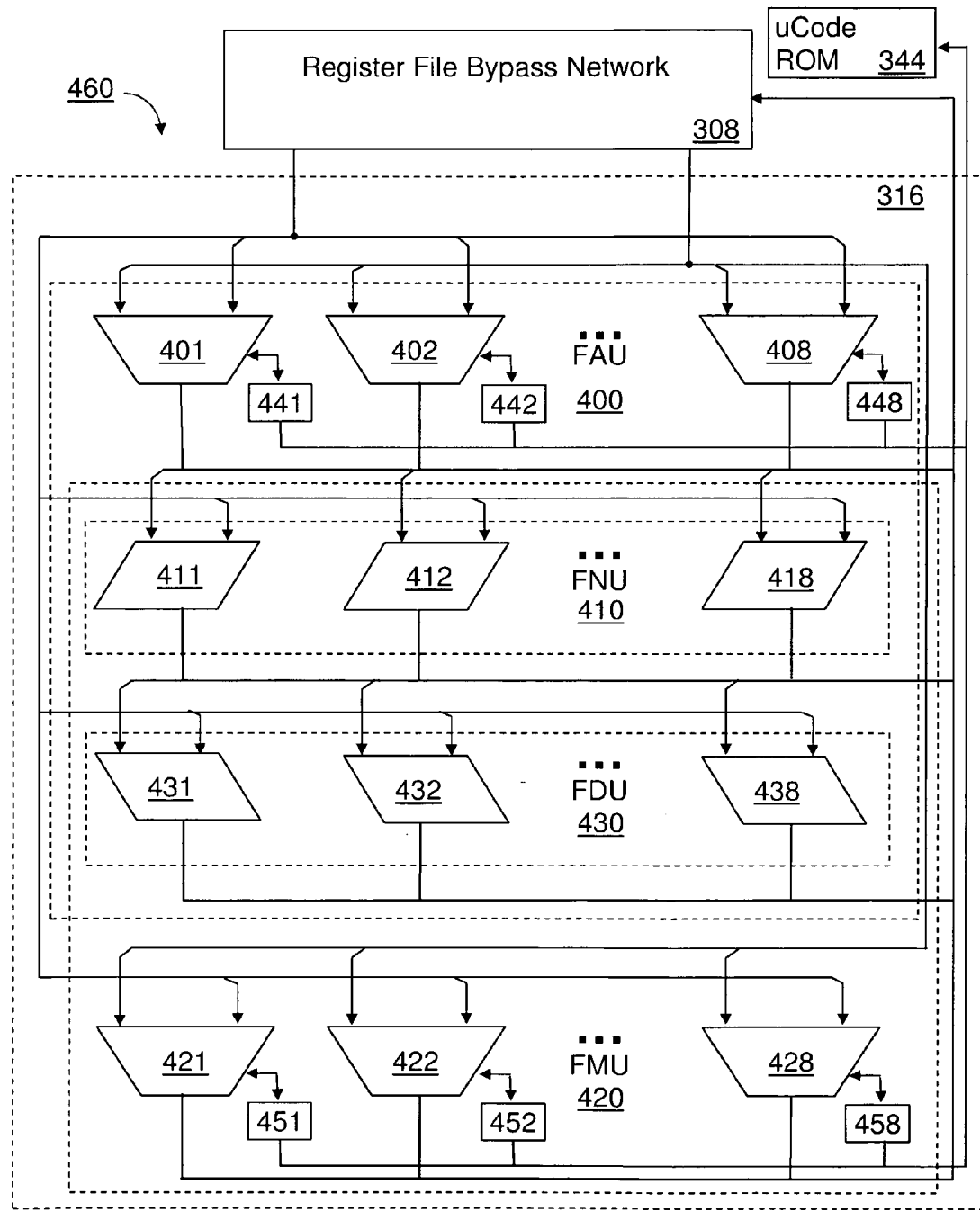
FIG. 4 illustrates one alternative embodiment of an apparatus for efficiently handling floating point exceptions in a processor that executes single-instruction multiple-data (SIMD) instructions.

FIG. 4 illustrates one alternative embodiment of an apparatus 460 for efficiently handling floating point exceptions in a processor that executes single-instruction multiple-data (SIMD) instructions. The apparatus 460 includes the register file bypass network 308 operatively coupled with floating point execution unit 316. One embodiment of SIMD floating point execution unit 316 includes SIMD floating point adder unit (FAU) 400 and SIMD floating point multiplication unit (FMU) 420. Embodiments of includes SIMD FAU 400 and/or SIMD FMU 420 SIMD may also include floating point normalization unit (FNU) 410 and SIMD floating point denormalization unit (FDU) 430.

The SIMD FAU 400 includes floating point adders 401, 402, . . . 408, which may comprise a plurality of floating point adders capable of performing single precision additions using an internal floating point representation for single precision floating point values and a plurality of floating point adders capable of performing double precision additions using an internal floating point representation for double precision floating point values. In one embodiment of SIMD FAU 400, every other floating point adders 401, 402, . . . 408, is capable of performing both single and double precision additions. In an alternative embodiment of SIMD FAU 400, floating point adders 401, 402, . . . 408 may be divided and/or combined to perform single and/or double precision additions respectively. Embodiments of floating point adders 401, 402, . . . 408 include alignment circuits to align the mantissas of floating point operand elements and adder circuits to add the mantissas of floating point operand elements.

The SIMD FAU 400 also includes exception circuits 441, 442, . . . 448, coupled with floating point adders 401, 402, . . . 408, respectively. Some embodiments of exception circuits 441, 442, . . . 448 comprise denormal detection circuits to detect denormal elements of the packed operands for SIMD floating point addition operations and exception generation circuits to identify exceptional results of SIMD floating point addition operations including denormal results. Embodiments of exception circuits 441, 442, . . . 448 may also be operatively coupled with microcode ROM 344 to initiate a sequence of micro-ops to re-execute a SIMD floating point addition operation in response to identified exceptional results. In some embodiments of SIMD FAU 400, the alignment circuits of floating point adders 401, 402, . . . 408 can align a mantissa of a denormal first element with a mantissa of a corresponding second element according to an unbiased exponent difference (i.e. rather than a biased exponent difference) if the corresponding second element is not a denormal, but leave the alignment unchanged when both of the first and second elements are denormals. In these embodiments, floating point adders 401, 402, . . . 408 may also round and renormalize a resulting sum (e.g. through FNU 410) if the resulting sum can be represented as a normal result element of a packed result for the SIMD floating point addition operation. Embodiments of floating point adders 401, 402, . . . 408 (or of normalizers 411, 412, . . . 418) may also set a flag to identifying an addition result as a denormal element of the packed result if it is determined that the result can not be represented as a normal result element of the packed result for the SIMD floating point addition operation.

Embodiments of register file bypass network 308 also comprise result storage circuits to store the packed results for SIMD floating point operations and to store any flags identifying result elements as denormal elements of the packed result.

The SIMD FNU 410 includes floating point normalizers 411, 412, . . . 418, which may comprise a plurality of floating point normalizers capable of performing single precision normalizations using an internal floating point representation for single precision floating point values and a plurality of floating point normalizers capable of performing double precision normalizations using an internal floating point representation for double precision floating point values. In one embodiment of SIMD FNU 410, every other floating point normalizer 411, 412, . . . 418, is capable of performing both single and double precision normalizations. In an alternative embodiment of SIMD FNU 410, floating point normalizers 411, 412, . . . 418 may be divided and/or combined to perform single and/or double precision normalizations respectively. Embodiments of floating point normalizers 411, 412, . . . 418 may also include mantissa rounding circuits to perform concurrent single and/or double precision rounding and normalization. Some embodiments of floating point normalizers 411, 412, . . . 418 may be able to exploit a constant value (e.g. 10) in a normalization to a pseudo internal floating point representation of packed operands.

The SIMD FMU 420 includes floating point multipliers 421, 422, . . . 428, which may comprise a plurality of floating point multipliers capable of performing single precision multiplications using an internal floating point representation for single precision floating point values and a plurality of floating point multipliers capable of performing double precision multiplications using an internal floating point representation for double precision floating point values. In one embodiment of SIMD FMU 420, every other floating point multiplier 421, 422, . . . 428, is capable of performing both single and double precision multiplications. In an alternative embodiment of SIMD FMU 420, floating point multipliers 421, 422, . . . 428 may be divided and/or combined to perform single and/or double precision multiplications respectively.

The SIMD FMU 420 also includes exception circuits 451, 452, . . . 458, coupled with floating point multipliers 421, 422, . . . 428, respectively. Some embodiment of exception circuits 451, 452, . . . 458 comprise denormal detection circuits to detect denormal elements of the packed operands for SIMD floating point multiplication operations and exception generation circuits to identify exceptional results of SIMD floating point multiplication operations including denormal results. Embodiments of exception circuits 451, 452, . . . 458 may also be operatively coupled with microcode ROM 344 to initiate a sequence of micro-ops to re-execute a SIMD floating point multiplication operation in response to detected denormal elements of packed operands or in response to identified exceptional results.

Embodiments of floating point multipliers 421, 422, . . . 428 may include exponent comparator circuits and predictors to make predictions for some common results (e.g. zero, the smallest representable denormal, or optionally infinity) of multiplication by an exceptional operand element based on the comparisons, and to cause the results of such predictions to be stored as a result of the multiplication to avoid an exception. Otherwise when such common results of multiplication by an exceptional operand element are not predicted, a multiplication may carried out on the operands received and any exceptions that occur may be handled in accordance with alternative techniques herein described (e.g. as in process 801).

The SIMD FDU 430 includes floating point denormalizers 431, 432, . . . 438, which may comprise a plurality of floating point denormalizers capable of performing single precision denormalizations using an internal floating point representation for single precision floating point values and a plurality of floating point denormalizers capable of performing double precision denormalizations using an internal floating point representation for double precision floating point values. In one embodiment of SIMD FDU 430, every other floating point denormalizer 431, 432, . . . 438, is capable of performing both single and double precision denormalizations. In an alternative embodiment of SIMD FDU 430, floating point denormalizers 431, 432, . . . 438 may be divided and/or combined to perform single and/or double precision denormalizations respectively. Embodiments of floating point denormalizers 431, 432, . . . 438 may also include mantissa rounding circuits to perform concurrent single and/or double precision rounding and denormalization. Some embodiments of floating point denormalizers 431, 432, . . . 438 may be able to exploit constant denormal exponent values (e.g. −126 or −1022) in the denormalization of pairs of packed partial results.

Embodiments of SIMD FNU 410 may be operable to produce a pseudo internal floating point representation of a packed operand having normal and/or denormal component floating point elements. Embodiments of SIMD FAU 400 and SIMD FMU 420 may be operable in a normal mode to produce a single packed result having normal component floating point elements, and in a numerical exception handling mode to produce two packed partial results of a packed result having normal and/or denormal component floating point elements. In one embodiment of the numerical exception handling mode, a phase-one packed partial result and a phase-two packed partial result may be stored to separate storage locations in a register file (concurrently or separately in either temporal order) to constitute the two packed partial results. Embodiments of microcode ROM 344 may also include micro-ops to indicate to SIMD FAU 400 and SIMD FMU 420 whether they are executing in phase-one of numerical exception handling mode or in phase-two of numerical exception handling mode. Embodiments of SIMD FDU 430 may be operable to receive the two packed partial results of a packed result having normal and/or denormal component floating point elements and to produce a single packed result having normal and/or denormal component floating point elements.

Figure 5A:
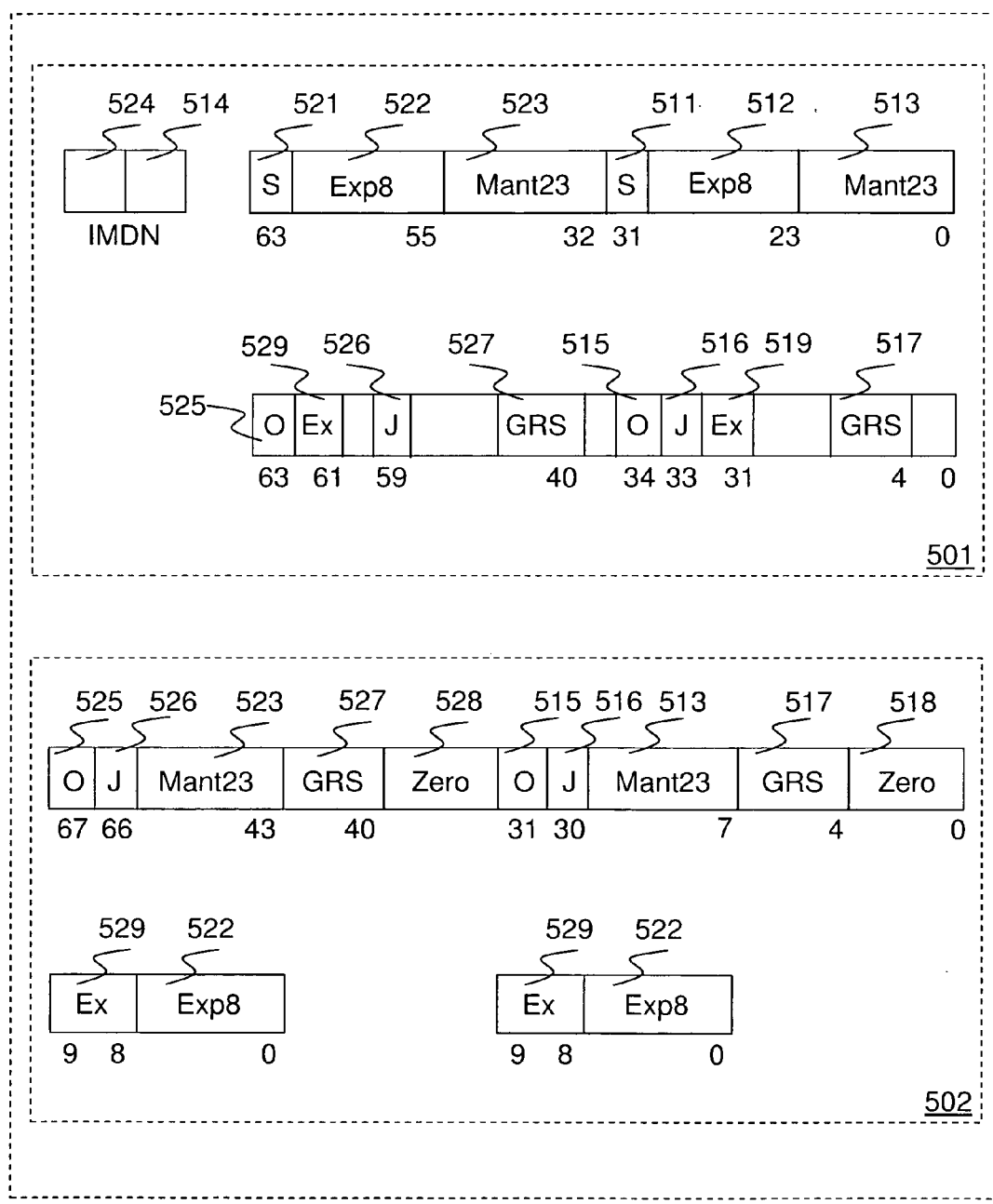
FIGS. 5a-b illustrate exemplary storage formats for storing internal representations of packed floating point numbers.

FIG. 5a illustrates exemplary storage formats 501 and 502 for storing internal representations of packed floating point numbers. Format 501 and format 502 are illustrated using a pair of single precision floating point numbers, but it will be appreciated that format 501 and format 502 are merely representative of typically wider packed floating point operands (e.g. of packed operands having 4 single precision or 2 double precision elements, or of packed operands having 8 single precision or 4 double precision elements).

Format 501 represents an example of a pair of packed partial results (in a SIMD register file, e.g. such as in register file bypass network 308) of a packed single precision destination operand for SIMD floating point operations. Format 501 includes a pair of single precision elements, each comprising 39 bits: a first element including a sign bit (S 511), 10 exponent bits (Ex 519 and Exp8 512), and 28 mantissa bits (O 515, an explicit bit J 516, Mant23 513 and GRS 517); and a second element including a sign bit (S 521), 10 exponent bits (Ex 529 and Exp8 522), and 28 mantissa bits (O 525, an explicit bit J 526, Mant23 523 and GRS 527). Format 501 includes a pair of flag bits IMDN 514 and 524 to identifying whether the first element and/or the second element, respectively, are denormal elements.

In one embodiment of format 501, components of the pair of single precision elements are stored in two packed data registers: a first packed data register comprising the pair of flag bits IMDN 514 and 524, sign bit S 521 (e.g. bit 63), exponent bits Exp8 522 (e.g. bits 62-55), mantissa bits Mant23 523 (e.g. bits 54-32), sign bit S 511 (e.g. bit 31), exponent bits Exp8 512 (e.g. bits 30-23), mantissa bits Mant23 513 (e.g. bits 22-0); and a second packed data register comprising two most significant mantissa bits O 525 and J 526 (e.g. bits 63 and 59), exponent bits Ex 529 (e.g. bits 62-61), three least significant mantissa bits GRS 527 (e.g. bits 42-40), two most significant mantissa bits O 515 and J 516 (e.g. bits 34-33), exponent bits Ex 519 (e.g. bits 32-31), and three least significant mantissa bits GRS 517 (e.g. bits 6-4).

It will be appreciated that the specific locations where components of the packed elements are stored in the two packed data registers as a pair of packed partial results may be chosen by a designer so as to conveniently facilitate multiplexing components of the packed elements from the pair of packed partial results into an internal floating point representation of a floating point arithmetic unit (e.g. SIMD FAU 400 and/or SIMD FDU 430 for denormalization).

Format 502 represents an example of an internal floating point representation (in a floating point arithmetic unit, e.g. such as FAU 400) of a packed source operand for SIMD floating point operations. Like format 501, format 502 includes internal representations of a pair of single precision elements, each comprising 39 bits: the first element including a sign bit (S 511), 10 exponent bits (Ex 519 and Exp8 512), and 28 mantissa bits (O 515, J 516, Mant23 513 and GRS 517); and the second element including a sign bit (S 521), 10 exponent bits (Ex 529 and Exp8 522), and 28 mantissa bits (O 525, J 526, Mant23 523 and GRS 527). In one embodiment of format 502, the internal floating point representation of a floating point arithmetic unit stores separate exponents: Ex 519 and Exp8 512 for the first element (e.g. bits 9-0), and Ex 529 and Exp8 522 for the second element (e.g. bits 9-0). In this embodiment of format 502, the mantissas of the two elements may be stored as packed mantissas: the first mantissa having O 515 (e.g. bit 67), J 516 (e.g. bit 66), Mant23 513 (e.g. bits 65-43) and GRS 517 (e.g. bits 42-40); and the second mantissa having O 525 (e.g. bit 31), J 526 (e.g. bit 30), Mant23 523 (e.g. bits 29-7) and GRS 527 (e.g. bits 6-4); with z padding in the least significant bits of each (e.g. bits 39-32 and bits 3-0).

Figure 5B:
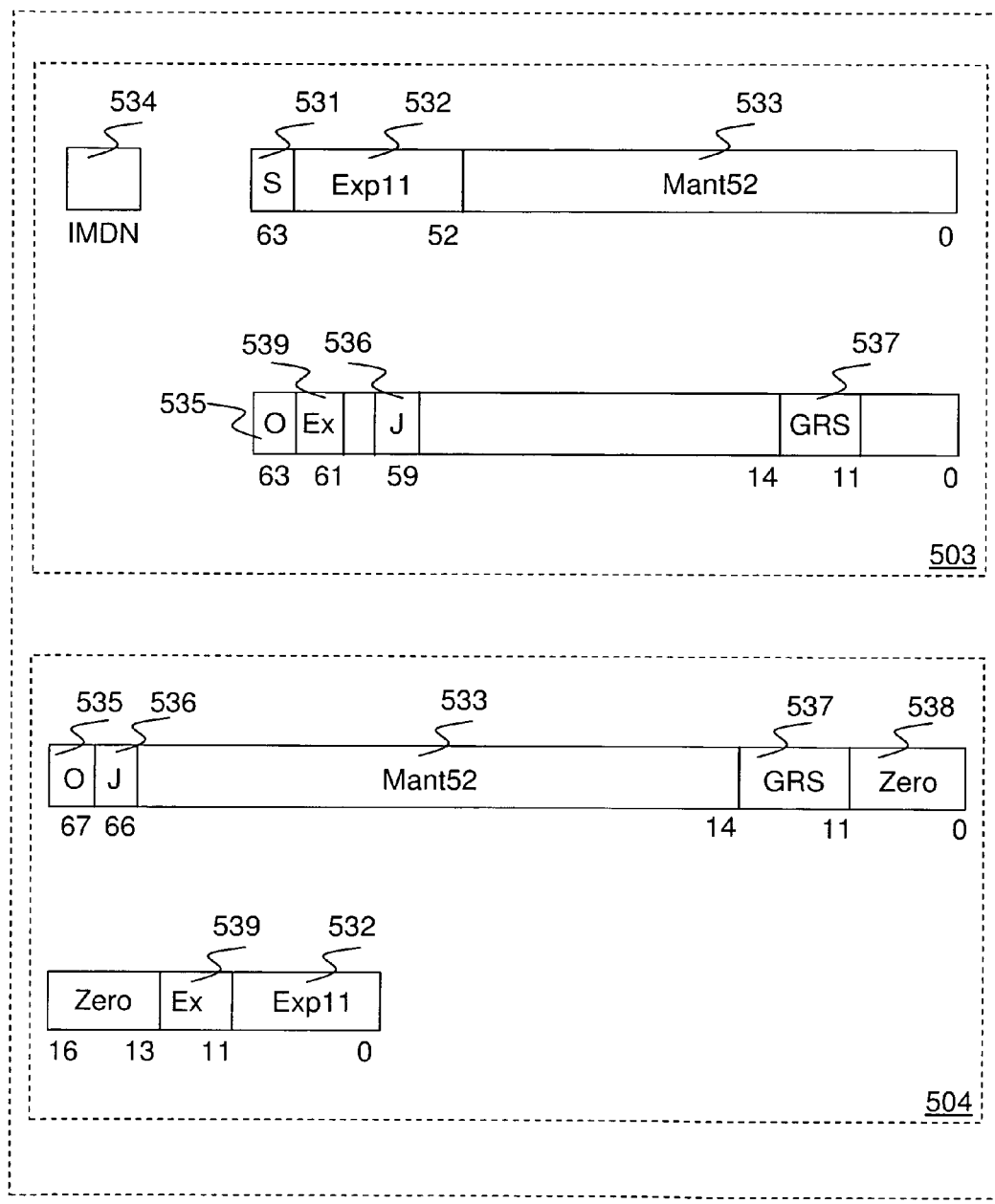

FIG. 5b illustrates exemplary storage formats 503 and 504 for storing internal representations of packed floating point numbers. Format 503 and format 504 are illustrated using one double precision floating point number, but it will be appreciated that format 503 and format 504 are merely representative of typically wider packed floating point operands (e.g. of packed operands having 4 single precision or 2 double precision elements, or of packed operands having 8 single precision or 4 double precision elements).

Format 503 represents an example of a pair of packed partial results (in a SIMD register file, e.g. such as in register file bypass network 308) of a double precision destination operand element of a packed operand for SIMD floating point operations. Format 503 includes a pair of packed partial results of a double precision element comprising 71 or more bits including: a sign bit (S 531), 13 or more exponent bits (Ex

539 and Exp11 532), and 57 mantissa bits (O 535, an explicit bit J 536, Mant52 533 and GRS 537). Format 503 includes a flag bit IMDN 534 associated with each double precision element to identifying whether that element is a denormal element.

It will be appreciated that the specific locations where components of packed elements are stored in the two packed data registers as a pair of packed partial results may be chosen by a designer so as to conveniently facilitate multiplexing components of packed elements from the pair of packed partial results into an internal floating point representation of a floating point arithmetic unit.

Format 504 represents an example of an internal floating point representation (in a floating point arithmetic unit, e.g. such as FAU 400) of a packed source operand element of a packed operand for SIMD floating point operations. Like format 503, format 504 includes an internal representation of a double precision elements comprising 71 or more bits including: a sign bit (S 531), 13 or more exponent bits (Ex 539 and Exp11 532), and 57 mantissa bits (O 535, J 536, Mant52 533 and GRS 537). In one embodiment of format 504, the internal floating point representation of a floating point arithmetic unit stores separate exponents Ex 539 and Exp11 532 for each element (e.g. bits 16-0). In this embodiment of format 504, the mantissas of the packed elements may be stored as packed mantissas, the first mantissa having: O 535 (e.g. bit 67), J 536 (e.g. bit 66), Mant52 533 (e.g. bits 65-14) and GRS 537 (e.g. bits 14-11), with zero padding in the least significant bits of each (e.g. bits 10-0).

It will be appreciated that using internal storage formats 501-504, packed floating point data may be stored in fixed sized registers while SIMD floating point exceptions may be handled transparently without converting to scalar operations and requiring the execution of only a small number of additional micro-operations. It will also be appreciated that in embodiments of format 501, 502, 503 and/or 504, some bits (e.g. O 525, J 526, O 535 and/or J 536) may be implicitly represented.

Figure 6:
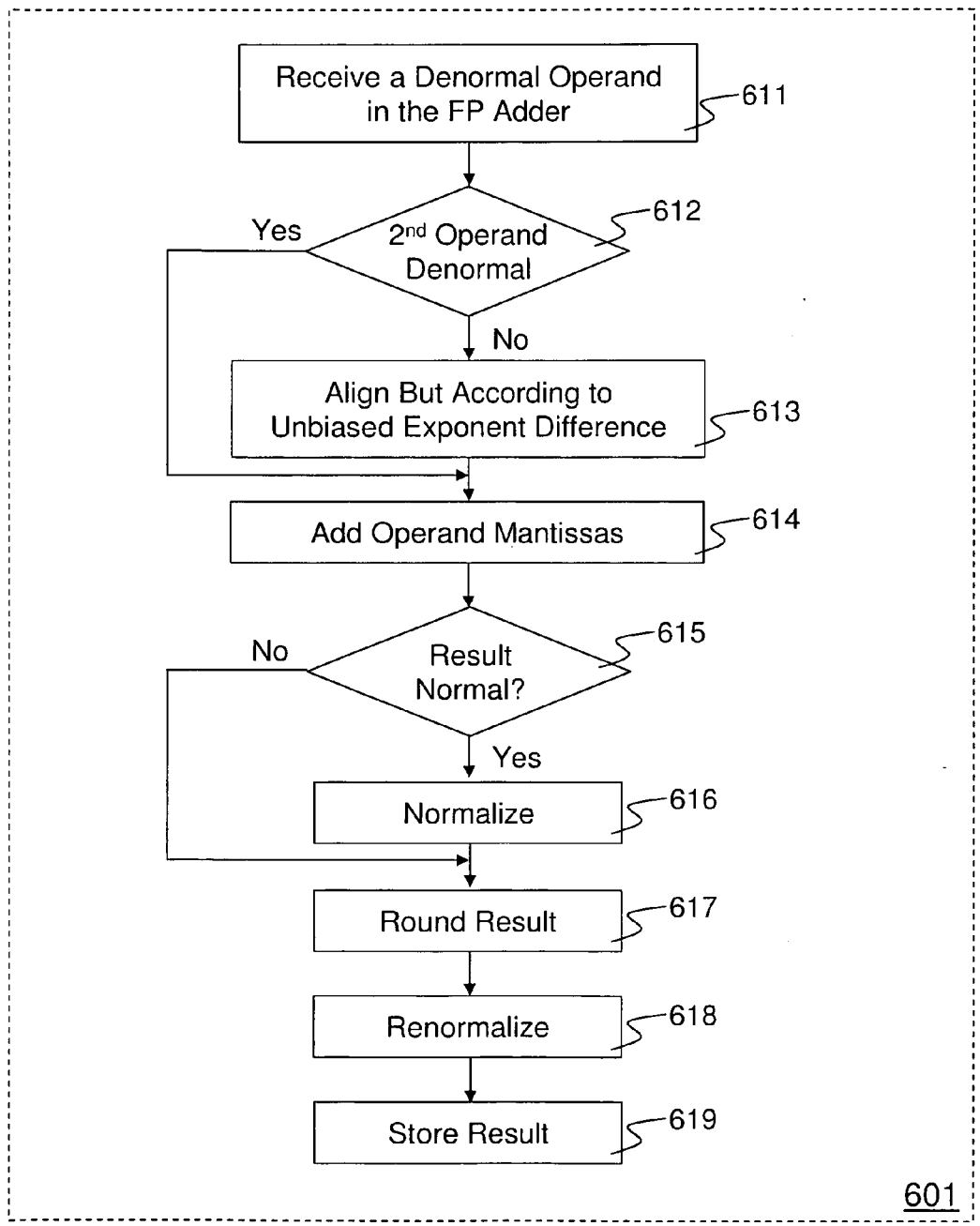
FIG. 6 illustrates a flow diagram for one embodiment of a process to handle certain numerical exceptions in a SIMD floating point adder.

FIG. 6 illustrates a flow diagram for one embodiment of a process 601 to handle certain numerical exceptions in a SIMD floating point adder. Process 601 and other processes herein disclosed are performed by processing blocks that may comprise dedicated hardware or software or firmware operation codes executable by general purpose machines or by special purpose machines or by a combination of both. Some embodiments of process 601 and other processes herein disclosed are embodied in machine-executable instructions or state transitions. The instructions or state transitions can be used to cause a general-purpose or special-purpose processor that is programmed with the instructions or state transitions to perform the steps of the present invention.

The present invention may be provided as a computer program product or software or microcode patch, which may include a machine or computer-readable medium having stored thereon instructions or state transitions which may be used to program a computer (or other electronic devices) to perform a process according to the present invention. Such software can be stored within a memory in the system or on a network server. Similarly, the code can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals.

Beginning in processing block 611, a denormal operand element of a packed operand for a SIMD floating point addition operation is received in one of the floating point adder circuits of the SIMD FAU. In processing block 612 it is determined if a corresponding second operand element of a second packed operand for the SIMD floating point addition operation is also denormal. In one embodiment the denormal operand element and potentially the corresponding second operand element may be detected by a denormal detection circuit (e.g. one of circuits 441-448).

If the corresponding second operand element is not denormal, the denormal operand element and the corresponding second operand element are input to an alignment circuit in processing block 613 where the mantissa of the denormal operand element is aligned with the mantissa of the corresponding second operand element according to an unbiased exponent difference. Otherwise, the mantissas of the denormal operand element and the corresponding second operand element are already aligned if the corresponding second operand element is also denormal so processing proceeds directly to processing block 614 where the mantissas are added by the floating point adder circuit.

In processing block 615, it is determined if the result of the addition can be represented as a normal floating point result element of a packed result for the SIMD floating point addition operation. If so, the resulting sum is normalized in processing block 616. Otherwise the resulting sum is simply rounded in processing block 617 and renormalized (e.g. right shifted by one bit if O equals 1) in processing block 618, and a denormal result may be stored as an element of the packed result, when the packed result for the SIMD floating point addition operation is stored in processing block 619. It will be appreciated that a result storage circuit that stores the packed result for the SIMD floating point addition operation may also store a flag identifying the resulting sum as a denormal result element of the packed result if it was determined in processing block 615 that the resulting sum could not be represented as a normal floating point result element.

It will be appreciated that embodiments of process 601 may handle common exceptional inputs such as denormals in SIMD floating point operations in a SIMD execution unit (e.g. SIMD) floating point execution unit 316) without requiring additional assistance (e.g. from microcode).

Figure 7:
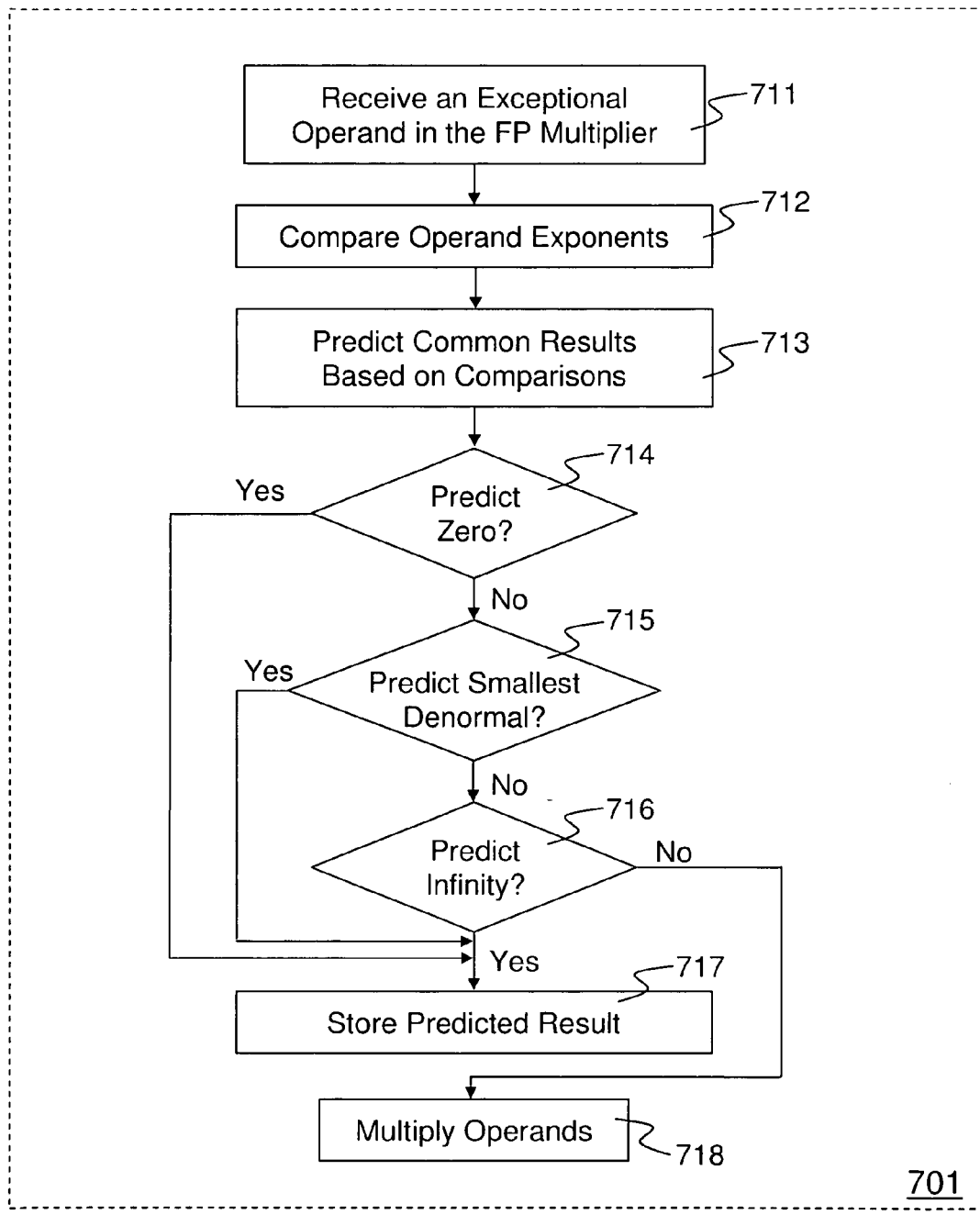
FIG. 7 illustrates a flow diagram for one embodiment of a process to handle certain common exceptions in a SIMD floating point multiplier.

FIG. 7 illustrates a flow diagram for one embodiment of a process 701 to handle certain common (masked) exceptions in a SIMD floating point multiplier. In processing block 711 an exceptional operand element of a packed operand for a SIMD floating point multiplication operation is received in one of the floating point multiplier circuits of the SIMD FMU. In processing block 712 the exponents of the corresponding operand elements are compared. Based on the comparison, predictions for some common results of multiplication by the exceptional operand element are made in processing block 713. In processing block 714, if the result is predicted to be zero, processing proceeds in processing block 717 where the predicted value of zero is stored as the result. Otherwise processing continues in processing block 715 where if the result is predicted to be the smallest representable denormal, processing proceeds in processing block 717 where the predicted smallest representable denormal value of is stored as the result. Otherwise processing optionally continues in processing block 716 where if the result is predicted to be infinity, processing proceeds in processing block 717 where the predicted value of infinity is stored as the result. Otherwise in processing block 718 the multiplication is carried out on the operands received and any exceptions that occur are handled in accordance with the alternative techniques herein described (e.g. as in process 801).

It will be appreciated that embodiments of process 701 may predict and handle common exceptional results of SIMD floating point operations in a SIMD execution unit (e.g. SIMD floating point execution unit 316) without requiring additional assistance (e.g. from microcode). In such commonly occurring cases, the penalties for handling exceptional cases may be substantially eliminated or reduced. Alternatively, techniques may be used in the remaining cases for handling SIMD floating point exceptions without converting to scalar operations and requiring the execution of only a small number of additional micro-operations.

Figure 8:
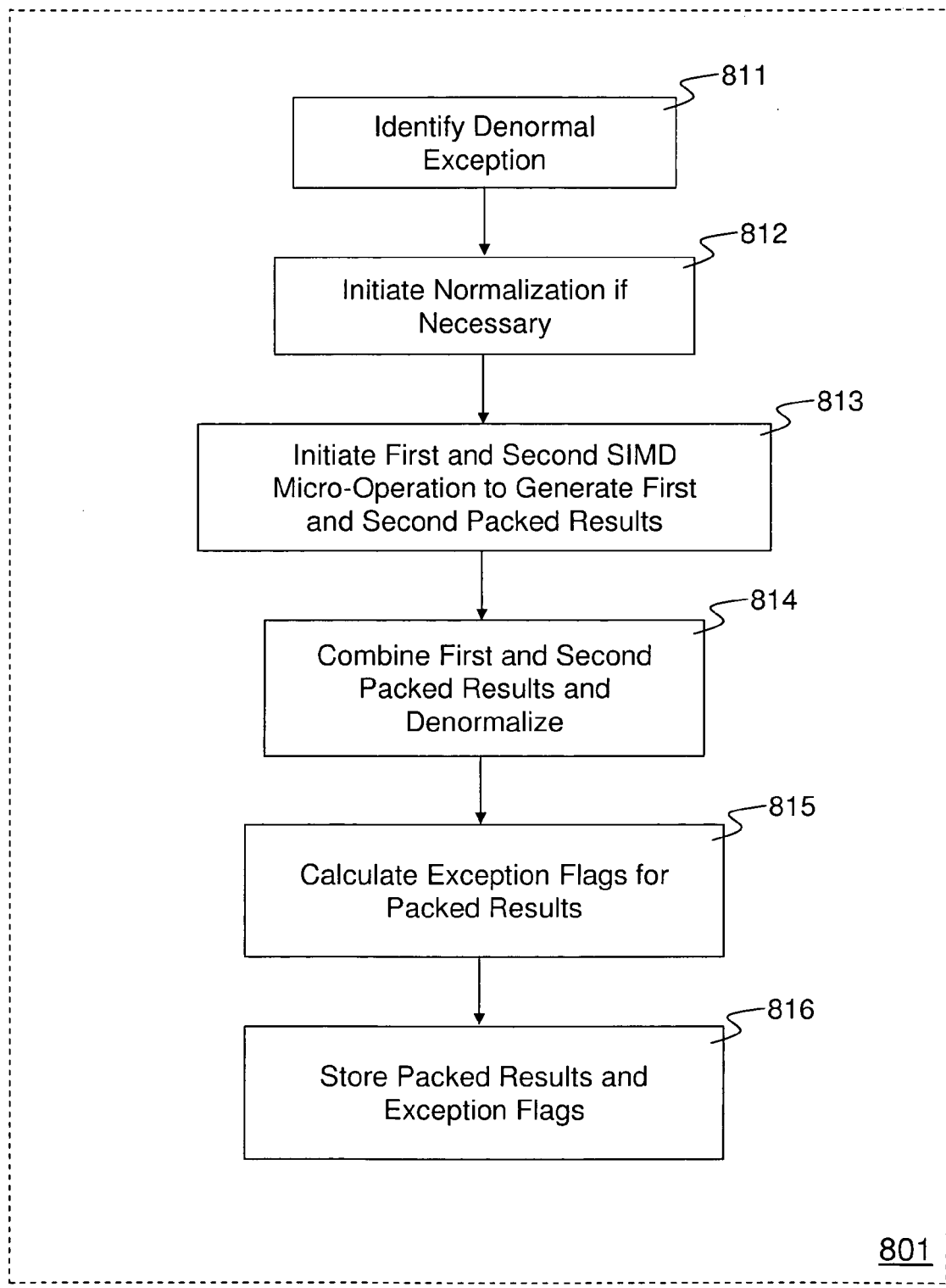
FIG. 8 illustrates a flow diagram for an alternative embodiment of a process to handle numerical exceptions in a processor that executes SIMD floating point instructions.

FIG. 8 illustrates a flow diagram for an alternative embodiment of a process 801 to handle denormal floating point exceptions in a processor that executes SIMD floating point instructions. In processing block 811 a numerical exception is identified for a SIMD floating point operation. Responsive to the numerical exception, one or more optional normalization micro-operation(s) are initiated in processing block 812 when necessary. For one embodiment of process 801, the normalization micro-operation(s) are initiated if the SIMD floating point operation is to be executed at least in part by a SIMD floating point multiplier (e.g. multiplication, division, square root, or conversion from single to double precision). As a result of the normalization micro-operation(s), a packed operand may be stored as a normalized pseudo internal floating point representation of the original packed operand for the SIMD floating point operation that contained a denormal. For one embodiment of process 801, the normalization micro-operation(s) are not required if the SIMD floating point operation is to be executed by a SIMD floating point adder (e.g. addition/subtraction, or conversion from double to single precision) as the SIMD floating point adder may be capable of accepting operands containing denormals as input.

In processing block 813 a first SIMD micro-operation is initiated to generate a first packed partial result for the SIMD floating point operation, and a second SIMD micro-operation is initiated to generate a second packed partial result for the SIMD floating point operation. It will be appreciated that in some embodiments of process 801, the first and second SIMD micro-operation may be executed in either order so long as they produce a pair of packed partial results to be stored for the packed result for the SIMD floating point operation.

In processing block 814 a SIMD denormalization micro-operation is initiated to combine the pair of packed partial results and to denormalize, as necessary, any elements of the combined packed partial results to generate a packed result having the corresponding denormal elements. For some embodiments of SIMD FAU 400, combining the pair of packed partial results may also include normalizing a packed partial result in phase-one of a numerical exception handling mode. In processing block 815 exception flags (e.g. IMDN 514 and 524 or 534) are calculated to identifying the denormal elements of the packed result. Those exception flags are stored as results along with the packed result for the SIMD floating point operation in processing block 816.

It will be appreciated that embodiments of process 801 provide efficient techniques that may be used for handling SIMD floating point exceptions that produce denormals and require re-execution. Such exceptions may be transparently handled in parallel without converting to scalar operations and requiring the execution of only a small number of additional micro-operations.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method for handling floating point exceptions in a processor that executes single-instruction multiple-data (SIMD) instructions, the method comprising:
   identifying a numerical exception for a SIMD floating point operation;
   initiating a first SIMD micro-operation to generate a first packed partial result for the SIMD floating point operation;
   initiating a second SIMD micro-operation to generate a second packed partial result for the SIMD floating point operation, wherein a set of one or more packed source operands used to produce the first and second packed partial results for the SIMD floating point operation are stored in their original representation widths;
   initiating a SIMD denormalization micro-operation to combine the first and second packed partial results and to denormalize a first element of the combined first and second packed partial results to generate a third packed result having a denormal element;
   storing the third packed result for the SIMD floating point operation; and
   setting a flag identifying the denormal element of the third packed result in said first packed partial result.

2. The method of claim 1 further comprising:
   initiating a SIMD normalization micro-operation on the first packed partial result for the SIMD floating point operation.

3. The method of claim 1, further comprising initiating the second SIMD micro-operation before initiating the first SIMD micro-operation.

4. The method of claim 1, further comprising initiating the third SIMD micro-operation if the SIMD floating point operation is executed at least in part in a SIMD floating point multiplier.

5. The method of claim 4, further comprising not initiating the third SIMD micro-operation if the SIMD floating point operation is executed at least in part in the SIMD floating point multiplier.

6. An article of manufacture comprising:
   a non-transitory machine-accessible storage medium including data and instructions for handling a numerical exception for a single-instruction multiple-data (SIMD) floating point operation such that, when accessed by a machine, causes the machine to:
   initiate a first SIMD micro-operation to generate a first packed partial result for the SIMD floating point operation;
   initiate a second SIMD micro-operation to generate a second packed partial result for the SIMD floating point operation, wherein a set of one or more packed source operands used to produce the first and second sacked partial results for the SIMD floating point operation are stored in their original representation widths;
   initiate a SIMD denormalization micro-operation to combine the first and second packed partial results and to denormalize a first element of the combined first and second packed partial results to generate a third packed result having a denormal element;

store the third packed result for the SIMD floating point operation; and set a flag identifying the denormal element of the third packed result in said first packed partial result.

7. The article of manufacture of claim 6, the non-transitory machine-accessible storage medium including data and instructions that when accessed by a machine, causes the machine to:

initiate a SIMD normalization micro-operation on the first packed partial result for the SIMD floating point operation.

8. The article of manufacture of claim 6, the non-transitory machine-accessible storage medium including data and instructions that when accessed by a machine, causes the machine to:

initiate the second SIMD micro-operation before initiation of the first SIMD micro-operation.

9. The article of manufacture of claim 6, the non-transitory machine-accessible storage medium including data and instructions that when accessed by a machine, causes the machine to:

initiate the third SIMD micro-operation if the SIMD floating point operation is executed at least in part in a SIMD floating point multiplier.

10. The article of manufacture of claim 6, the non-transitory machine-accessible storage medium including data and instructions that when accessed by a machine, causes the machine to:

not initiate the third SIMD micro-operation if the SIMD floating point operation is not executed at least in part in the SIMD floating point multiplier.

11. A processor comprising:

a register file to store a plurality of packed floating point operands and a plurality of packed floating point results for single-instruction multiple-data (SIMD) floating point operations;

an exception generation circuit to identify a numerical exception for a first SIMD floating point operation;

a microcode exception handler, responsive to the numerical exception, to initiate a first SIMD micro-operation to generate a first packed result for the SIMD floating point operation;

the microcode exception handler, further responsive to the numerical exception, to initiate a second SIMD micro-operation to generate a second packed result for the SIMD floating point operation, wherein a set of one or more packed source operands used to produce the first and second packed partial results for the SIMD floating point operation are stored in their original representation widths;

the microcode exception handler, further responsive to the numerical exception, to initiate a SIMD denormalization micro-operation: to combine the first and second packed results, to denormalize an element of the combined first and second packed results, to generate a third packed result having the denormalized element, to store the third packed result for the SIMD floating point operation, and to set a flag identifying the denormalized element of the third packed result in said first packed result.

12. The processor of claim 11, wherein the processor comprises a floating point adder unit to perform single precision and double precision additions, and including exception circuitry to detect denormal elements of operands and results.

13. The processor of claim 11, wherein the processor comprises a floating point multiplication unit to perform single precision and double precision multiplications, and including exception circuitry to detect denormal elements of operands and results.

14. The processor of claim 11, wherein the processor comprises a floating point denormalization unit to perform single precision and double precision denormalization.

15. An apparatus comprising:

a processor including a single-instruction multiple-data (SIMD) floating point execution unit including:

a floating point adder unit to perform single precision and double precision additions, and including exception circuitry to detect denormal elements of operands and results;

a floating point multiplication unit to perform single precision and double precision multiplications, and including exception circuitry to detect denormal elements of operands and results;

a floating point denormalization unit to perform single precision and double precision denormalization; and a microcode storage to store a plurality of SIMD micro-operations including a first SIMD micro-operation to generate a first packed partial result for a SIMD floating point operation, a second SIMD micro-operation to generate a second packed partial result for the first SIMD floating point operation, wherein the processor is to store a set of one or more packed source operands used to produce the first and second packed partial results for the first SIMD floating point operation in their original representation widths, and a SIMD denormalization micro-operation to combine the first and second packed partial results and to denormalize a first element of the combined first and second packed partial results to generate a third packed result having a denormal element, wherein a flag to identify the denormal element of the third packed result is to be stored with the first packed partial result.

* * * * *

UNITED STATES PATENT AND TRADEMARK OFFICE
CERTIFICATE OF CORRECTION

Page 1 of 1

PATENT NO.       : 8,103,858 B2
APPLICATION NO.  : 12/217084
DATED            : January 24, 2012
INVENTOR(S)      : Zeev Sperber et al.

It is certified that error appears in the above-identified patent and that said Letters Patent is hereby corrected as shown below:

Column 16:
Line 60, "second sacked" should be --second packed--

Signed and Sealed this
Twenty-fourth Day of July, 2012

David J. Kappos
*Director of the United States Patent and Trademark Office*